US 7,814,049 B2

(12) United States Patent
Aboukrat et al.

(10) Patent No.: US 7,814,049 B2
(45) Date of Patent: Oct. 12, 2010

(54) COMPUTER DEVICE FOR MANAGING DOCUMENTS IN MULTI-USER MODE

(75) Inventors: Maurice Aboukrat, La Varenne Saint Hilaire (FR); Jean-Paul Pothin, L'Hay les Roses (FR); Frédérick Guillaume, Pierrefitte sur Seine (FR); Benoît Fillon, Montrouge (FR)

(73) Assignee: Trace One, Paris (FR)

( * ) Notice: Subject to any disclaimer, the term of this patent is extended or adjusted under 35 U.S.C. 154(b) by 744 days.

(21) Appl. No.: 10/551,369

(22) PCT Filed: Mar. 30, 2004
(Under 37 CFR 1.47)

(86) PCT No.: PCT/FR2004/000798
§ 371 (c)(1),
(2), (4) Date: Mar. 23, 2007

(87) PCT Pub. No.: WO2004/090749
PCT Pub. Date: Oct. 21, 2004

(65) Prior Publication Data
US 2008/0288532 A1 Nov. 20, 2008

(30) Foreign Application Priority Data
Mar. 31, 2003 (FR) .................................. 03 03961

(51) Int. Cl.
*G06F 17/30* (2006.01)
(52) U.S. Cl. ...................... 707/608; 707/783
(58) Field of Classification Search ................. 707/608, 707/783
See application file for complete search history.

(56) References Cited

U.S. PATENT DOCUMENTS

| 6,088,702 | A | 7/2000 | Plantz et al. |
| 7,426,687 | B1 * | 9/2008 | Schultz et al. ............... 715/208 |
| 2003/0028798 | A1 * | 2/2003 | Burnett ....................... 713/200 |
| 2003/0061481 | A1 * | 3/2003 | Levine et al. ............... 713/163 |
| 2005/0154751 | A1 * | 7/2005 | Levi et al. ................... 707/102 |
| 2006/0101525 | A1 * | 5/2006 | Hiroi et al. .................... 726/28 |

FOREIGN PATENT DOCUMENTS

EP 0 837 400 A2 4/1998
EP 837400 A2 * 4/1998

OTHER PUBLICATIONS

Nuxeo, Collaborative Portal Server, Apr. 16, 2002 (hereinafter "Nuxeo").*
Koch et al., Using Component Technology for Group Editors—The Iris Group Editor Environment, Sep. 30, 1997 (hereinafter "Koch").*
International Search Report, dated Oct. 6, 2004, Corresponding to PCT/FR2004/000798.
2000 Microsoft Corporation, "Manage and Collaborate On Complex Word 2000 Documents" pp. 1-3, XP-002248908, Oct. 9, 2000.

(Continued)

*Primary Examiner*—James Trujillo
*Assistant Examiner*—William Spieler
(74) *Attorney, Agent, or Firm*—Jones Day

(57) ABSTRACT

A computer device for managing Documents in multi-user mode, including a document data processing tool, a document data display manager, and a document user rights manager.

10 Claims, 4 Drawing Sheets

OTHER PUBLICATIONS

Figure 1:
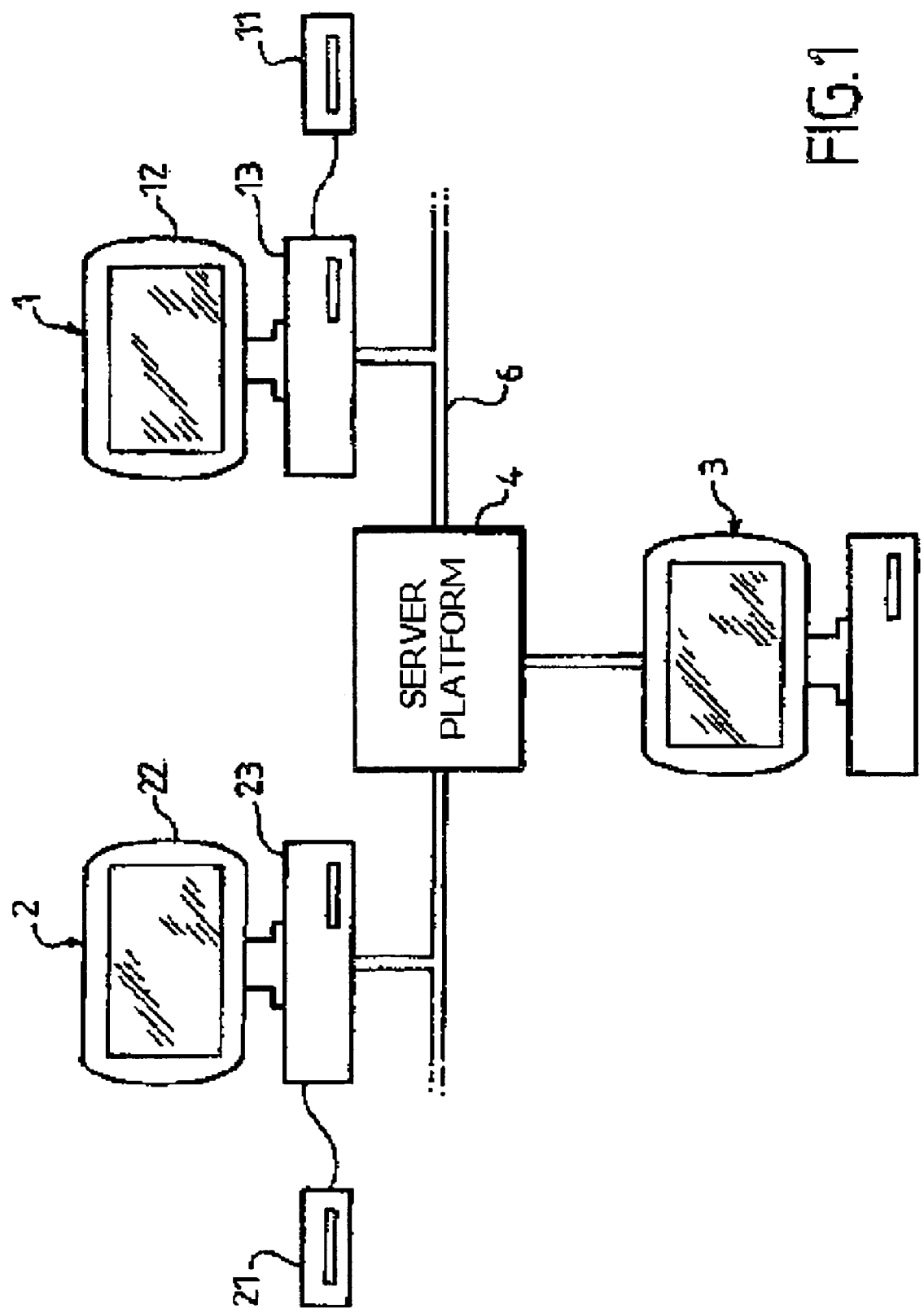

Koch, et al., "Using Component Technology for Group Editors—The Iris Group Editor Environment" ECSCW'97 OOGP Workshop, pp. 44-49, XP-002269799, Sep. 30, 1997.

Nüxeo, Collaborative Portal Server, pp. 1-20, XP-002269800, Apr. 16, 2002.

* cited by examiner

| ROLES | SPECIFICATION RIGHTS | | | | | | | | | | | | | | |
|---|---|---|---|---|---|---|---|---|---|---|---|---|---|---|---|
| | Display | Print | Search | Preview | Export to Excel | Create | Copy | Delete | Write | Validate | Discuss | Publish | Sign | Derogate | Revise spec. | Configure batch | Export to app |
| READER | ■ | ■ | ■ | ■ | ■ | | | | | | | | | | | | |
| AUTHOR | | | | | | ■ | ■ | ■ | | | | | | | ■ | | |
| EDITOR | | | | | | | | | ■ | ■ | ■ | | | | | ■ | |
| PUBLISHER | | | | | | | | | | | | ■ | | | | | |
| CONTRIBUTOR | | | | | | | | | | ■ | ■ | | | | | ■ | |
| SIGNATORY | | | | | | | | | | | | | ■ | ■ | | | |
| APPL EXPORTER | | | | | | | | | | | | | | | | | |

COMPUTER DEVICE FOR MANAGING DOCUMENTS IN MULTI-USER MODE

CROSS-REFERENCE TO RELATED APPLICATION

This application is a National Phase Patent Application of International Application Number PCT/FR2004/000798, filed on Mar. 30, 2004, which claims priority of French Patent Application Number 03/03961, filed on Mar. 31, 2003.

The embodiments of the present invention relate to the field of document management between different users at workstations connected together over a wide area network, for example, the Internet.

There is a need for an efficient tool to manage composite documents between different users. In effect, the technical components of current tools do not enable composite documents to be managed in a shared manner with the requisite degree of security.

The embodiments of the present invention provide an advance in this field.

The embodiments of the present invention relate to a computer system for managing composite documents in multi-user mode, including: a document data processing tool, a document data display manager, a document user rights manager.

According to one characteristic of an embodiment of the present invention, the processing tool includes: an object model, including a plurality of classes, structured to include a content pointer, a level indicator, an access method, a validation method, and a validation indicator, a document operator capable of creating and maintaining a document in the form of a set of object model class instances, the display manager being arranged to enable the joint display of a tree diagram, defined according to level indicators and display/input zones with tabs, corresponding to the contents of class instances existing in at least part of the tree diagram, the processing tool only authorizing access to a zone according to the access rights of the user concerned, as determined by the document user rights manager, in the event of access, the processing tool only authorizing validation of a zone according to the validation rights of the user concerned, as determined by the document user rights manager, the display manager additionally including a first mechanism capable of jointly modifying the display of a zone and a corresponding node in the tree diagram according to the validation status of the zone, and a second mechanism capable, judging by the level indicators, of causing a validated status to rise to a higher level node when all of the nodes of one level are validated, whereas, when the head of the tree diagram is validated, the processing tool authorizes the signature of the entire document by a user having corresponding signature rights.

Figure 2:
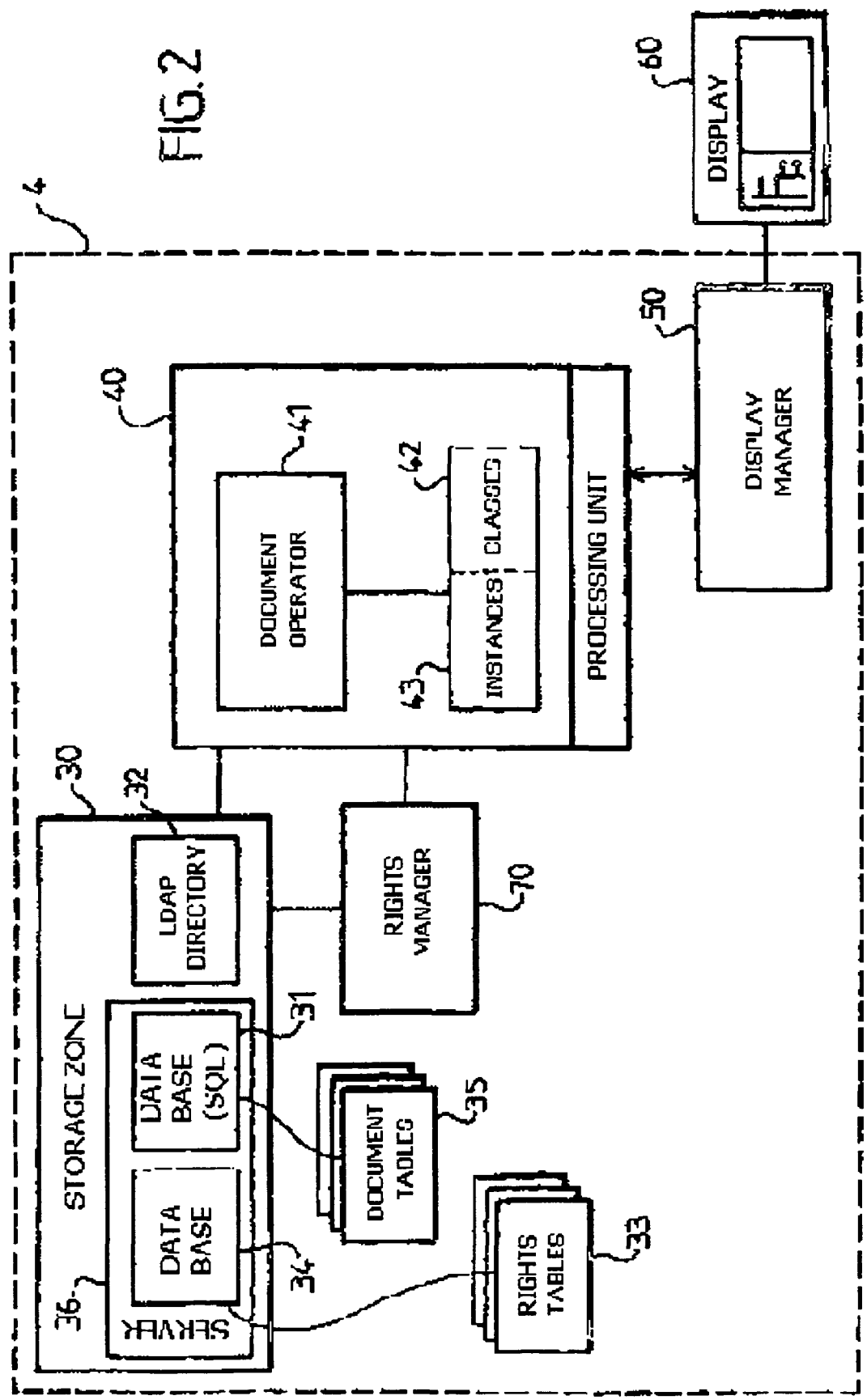
Figures 3, 4:
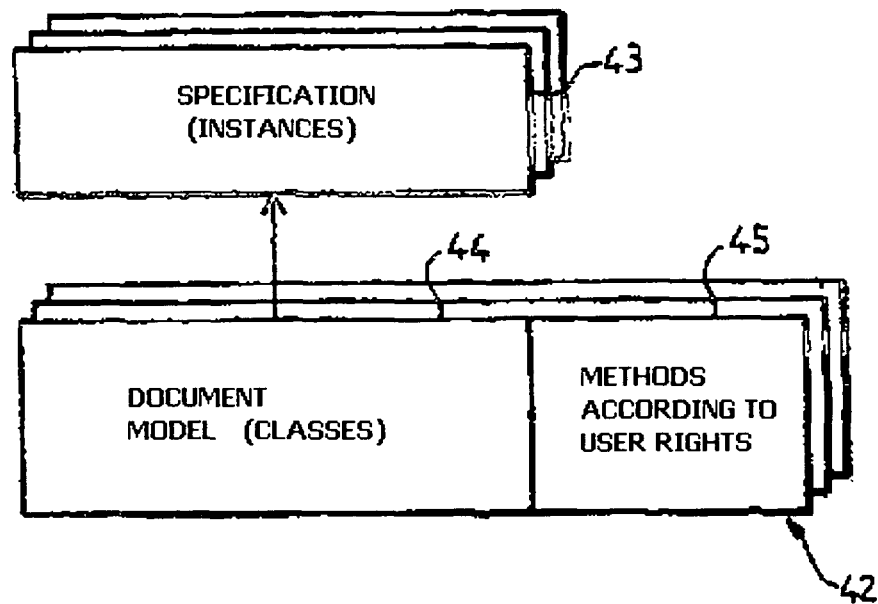
Figure 5:
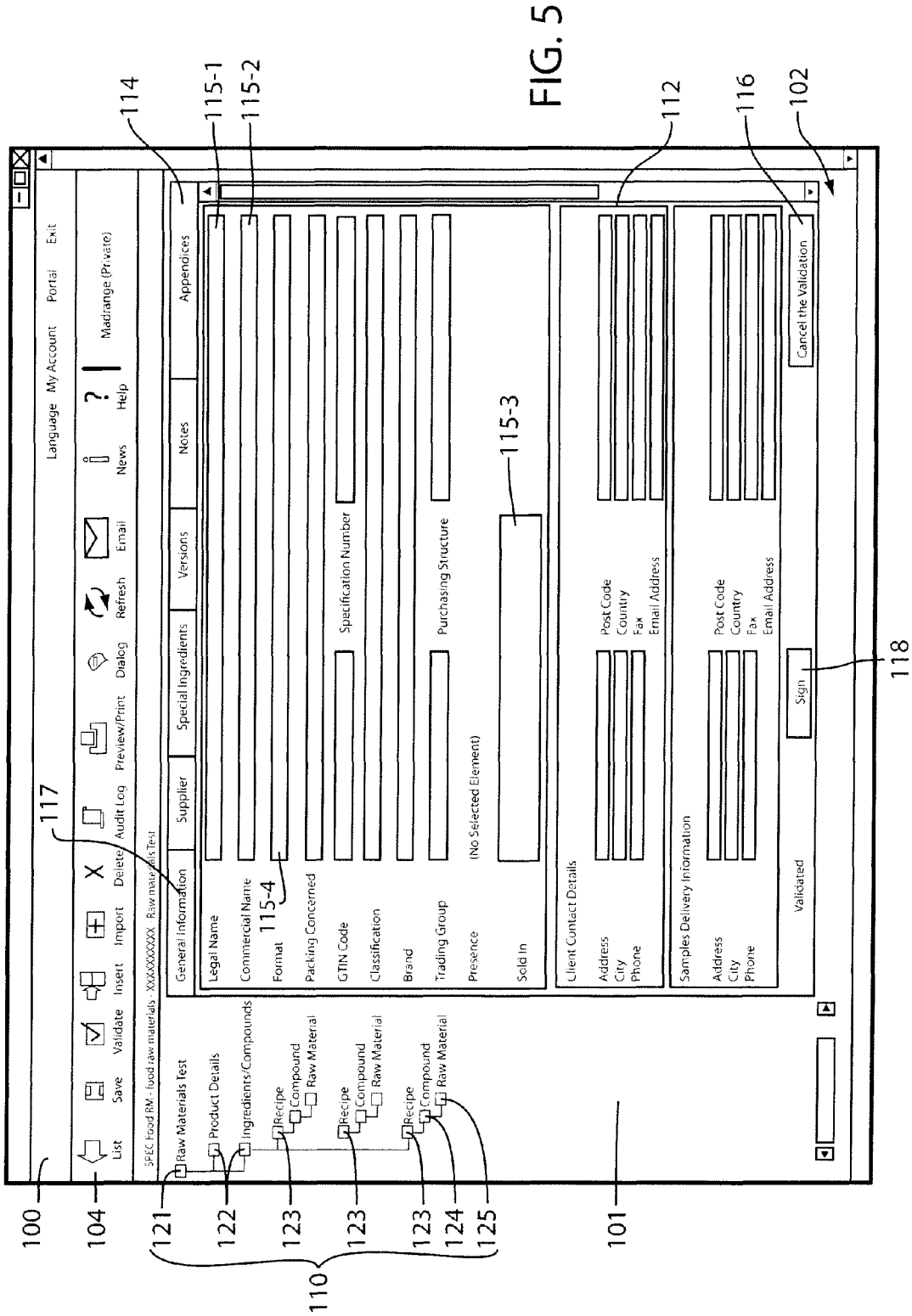

Other characteristics and advantages of the embodiments of the present invention will become apparent upon reading the following detailed description together with the attached drawings in which:

FIG. 1 illustrates a set of user workstations connected together over a wide area network, FIG. 2 is a block diagram of the elements of an embodiment of the present invention, FIG. 3 shows the corresponding classes and instances defining a document in an embodiment of the invention, FIG. 4 is a table summarizing the roles and rights of a user of the system according to an embodiment of the present invention, FIG. 5 is a view of the graphical interface offered to the user during utilization of the system according to an embodiment of the present invention.

The drawings essentially contain elements that are certain in character. They will therefore serve not only to aid understanding of the description but will also contribute to the understanding of the embodiments of the present invention as understood by a person of ordinary skill in the art.

FIG. 1 depicts three user workstations 1, 2, 3 connected together via a network 6 that can be a local area network, for example, an Ethernet network, or a wide area network, for example, the Internet. Workstation 1, respectively workstation 2, is equipped with a monitor 12, respectively a monitor 22, a central processing unit 13, respectively a central processing unit 23, connected to a USB port and a smart card reader 11, respectively a smart card reader 21. Each workstation is more particularly equipped with a microprocessor, a working memory (RAM type or any other suitable technology), a programming memory, a mass storage device (for example a hard disk), and additional peripheral components.

According to an embodiment of the present invention, workstation 1 is connected to workstation 2 via a server platform backed up and administered from a workstation 3. This workstation 3 represents an administration and backup network for the platform and a functional administration network for the platform.

This server platform 4 includes a first set of servers hosting an application available over the network 6 to the users of workstations 1 and 2 according to certain conditions. A user equipped with a smart card and a secret code issued by a secure means (PKI—public key infrastructure) inserts a smart card into the corresponding reader. The server platform will issue the user with a digital certificate on his/her smart card. Thus, a user is authenticated vis-a-vis the server platform by means of his/her smart card. This system enables a user to be identified in a secure manner on the server platform.

This server platform enables an identified user working at workstation 1 to process data in documents saved on this same platform, for example in a secure database, and also enables a second identified user working at workstation 2 to access and process some of this document data according to certain conditions described below.

In a general manner, workstations 1, 2, 3 and the server platform will utilize a suitable operating system, for example the Windows 2000® or XP® operating system.

FIG. 2 depicts the different functional units according to an embodiment of the present invention. These functional units are hosted in servers on the server platform 4 in FIG. 1.

In the description that follows, a user may belong to groups of users for example. A user role is a set of rights defined for that user. The following concepts are used: a community corresponds to a set of administrators and users belonging for example to the same commercial group and having common rights (or roles) such as the right to view the data of all members of the community, a member is a user who can belong to one or more communities and have rights (roles) specific to a member, a user can work either in his/her private workspace or in a collaborative workspace, for example a member can work with the community by moving from his/her private workspace to a collaborative workspace with the community.

The server platform includes a storage zone 30 comprising in particular an LDAP directory 32 and at least one database server 36. The directory defines the set of communities. The LDAP directory references, inter alia, the user accounts associated with the digital certificate. The LDAP directory also defines different roles for a user, together with the associated rights, according to the workspaces in which the user can work. The server 36 hosting databases of the relational database type (for example SQL) includes at least three databases: two databases 34 for the documents and one database 31 for the management of document rights. The database 34 defines at least one first set of tables 33.

A first set of related tables defines the role(s) of a user for a given document together with the rights associated with the roles. This first set of tables also defines the attributes of a document which can include the document type, its attachment to a document group, and the type of workspace in which a document is used.

For a user, the roles in the LDAP directory are additional to the roles defined in the database 34 for a given document. In another embodiment, the roles associated with the workspaces are defined in the relational database.

The database 31 defines at least one second set of tables. This second set of related tables 35 is defined around a table listing documents referred to as specifications. This set of related tables enables the composition of a document to be determined. Thus, a specification will include, according to a descending hierarchy of levels, a set of chapters, each chapter including a set of sections. A series of display zones with tabs can be assigned to each level. This set of tables also includes information on the validation of a tabbed display zone according to a given user, and on the signing of a specification by a given user.

The relational database 34 is linked to a database 31 used to store the document related data. Interrogation of the relational database 34 initiates a search for the corresponding data in the database 31.

The server platform 4 includes a rights manager 70. A table management class can be utilized by the rights manager. This class can include methods designed to create, edit or delete a new Document entry in the first set of tables at the request of an authorized user and to assign the corresponding rights for a given workspace and a document group for example. There are two types of documents: static and dynamic. A static document group defines a set of pre-existing documents. A dynamic document group is self-populating according to rules relating to the content of the documents. In other words, the documents included in a document group vary dynamically depending on the document contents. The rights manager 70 is designed to manage user rights defined for a group of documents and/or for a set of users. The rights manager is also capable of looking up the rights of a given user to a document in the relational database 34 and in the LDAP directory 32. The rights manager 70 instantiates a method of reading the table management class of the first set of tables, or a method of reading the role(s) of a given user, or a method of reading the rights of a given user to a document. The roles and/or rights of a user for a document are also determined from the attachment to a document group and for a given space.

In addition, at the request of an authorized administrator, the rights manager can also modify the information in the LDAP directory 32. Thus, the rights manager 70 will be authorized to add/delete a workspace (for example a private space or a collaborative space), create new rights or delete rights, and any other action based on the methods of a class enabling the information in the LDAP directory to be administered.

This rights manager 70 is linked to a processing unit 40 capable of processing document data. This processing unit includes an object model including a plurality of classes 42 and a document operator 41 capable of creating, on request by an authorized user, and maintaining a document in the form of a series of object model class instances 43. The object model is more particularly detailed in FIG. 3. Thus, classes 42 are used to define a document model 44 and methods 45 according to user rights determined by the rights manager 70. The document operator 41 is used to obtain by instantiation of the document model 44, a document defined as a specification 43 and whose data is stored in the database 34.

The methods 45 include for example a document access method and a document validation method. As described in detail below, these methods 45 can only be used by a given user subject to authorization by the processing unit according to the user's rights for this document. The server platform 4 also includes a display manager 50 designed to work in conjunction with the processing unit 40 and the storage zone 30 and with a display device 60 accessible to the user.

Once created, the class instances defining a document will be modified by the user as author or editor, these roles being defined below in FIG. 4, and the data will be saved in the storage zone at each modification, for example dynamically.

It will be useful to detail the different roles and rights that a user can have for a document.

This is detailed in particular in FIG. 4. Thus, the Table T is a table with two inputs: the rights of a user are specified in the table columns, and the roles of a user are indicated in the table rows. Thus, a role is defined as a set of rights, and each row of the table includes a series of markers shown as squares indicating the rights in the columns associated with a role corresponding to one of the rows.

In this example embodiment, the user's rights include the right to display, print, search, preview, create, duplicate, delete, export (for example to a spreadsheet), write, validate, discuss, publish, sign, and derogate, all in relation to a given document. Other rights in this case include the right to revise a subset, such as a specification, to make custom settings, in particular for a batch folder, and to export to a spreadsheet or to other applications.

User roles include the roles of reader, author, editor, publisher, contributor, signatory, and exporter to an application, all in relation to a given document.

Other rights and roles can be added as needed by a central administrator with the right to modify the roles and rights assigned to users.

The management of a composite document in multi-user mode proposed according to the embodiments of the present invention will be detailed more particularly in reference to FIG. 5.

The view in FIG. 5 corresponding to the display devices 60 in FIG. 2 is an example of the interface offered to the user. The processing unit transmits to the display manager 50 the class instances 43 defining a document including a class instances content pointer, a level indicator and methods as detailed below. The display manager 50 is arranged to enable the display of a tree diagram 110 in a joint manner in a part 101 of the window 100 and display/input zones with tabs 112 in a part 102 of the window 100, these zones corresponding to the contents of the class instances existing in a part of the tree diagram and the content pointer enabling the display of a zone from the tree diagram.

In a particular embodiment of the present invention, the processing unit 40 only allows the document to be displayed if the user has a right to display this document. The display is effected using a display method among the methods 45 in FIG. 3.

The display manager 50 enables a toolbar 104 to be displayed including icons corresponding to processing actions available for the document displayed by the user. These actions include the possibility of saving changes made to a document, validating a tabbed display/input zone of the document, deleting information in the tabbed display/input zones of the document, conducting a dialogue with another user in a collaborative space, for example for the purpose of validating a document modified and validated by a first user.

The processing unit authorizes the display manager to activate these toolbar icons according to the rights of the user concerned for this document in a given space. These rights are looked up by the rights manager 70 in FIG. 2. In addition, the processing unit transmits to the display manager 50 the document instance 43 including the methods corresponding to the actions available to a user on this document. Thus, depending on the rights of the document user, the methods will include in a non-limitative manner a method to display, a method to validate, a method to delete, a method to preview, and a method to dialogue, in the case of the document instance shown in FIG. 5.

On request by a user wishing to access a document, the processing unit verifies, via the rights manager, the user's rights to access the documents. Where access is possible, the processing unit retrieves the document data using the databases 31 and 34. Using this data, the processing unit utilizes appropriate classes to build a tree diagram of the document, on one hand, and to build a set of tabbed display/input zones and assign them to the various nodes of the tree diagram. On transmittal of this data from the processing unit to the display manager, the latter displays both the tree diagram and tabbed display/input zones in a joint manner on the display device 60. In the event of a user action on one of the components of the window 100, this action is dynamically processed by the processing unit using the appropriate classes.

In reference to FIG. 5, a displayed document will be detailed below by way of example.

This presents a view of a set of class instances defining a particular document corresponding to a specification for a consumer product.

The tree diagram 110 provides an outline view of the specification for the consumer product concerned. This tree diagram includes, in a descending hierarchy, different levels including one or more nodes. A document 121 includes chapters 122 at a level directly below. A chapter can include one or more sections 123 at a level directly below, and a section can include one or more sub-sections 124 at a level directly below, and these can in turn include one or more sub-sub-sections 125. Each level includes a level indicator. In the example shown, various square symbols denote the document, a square denotes the chapter, various circles denote the sections, a circle denotes the sub-sections, and a star denotes the sub-sub-sections. Advantageously, the level indicators can change color under certain conditions, in particular depending on a validation status. In another embodiment, these level indicators can appear under certain conditions, depending on a validation status for example.

The part 102 of the window 100 includes different display/input zones 112 with tabs 114. Thus, when a node of the tree diagram is activated by the user, different tabs appear in the part 102, and one of the tabbed display/input zones appears on the screen. Depending on the user's rights in relation to the document displayed, the tabbed display/input zones will be in read-only mode or in write mode. In the example tabbed display/input zone in FIG. 5, the user can write, modify and select information in appropriate input fields. In the example in FIG. 5, an identification tab 117 corresponding to the product file chapter 122 in the tree diagram includes different input fields 115 enabling the product to be identified. In this example, these fields include a generic name field 115-1, a commercial name field 115-2, a format field 115-4 in which a user selects a quantity of predefined products, and a field 115-3 in which the user selects a product marketing country. Each tabbed display/input zone includes a button 116 for validation of the zone by the user.

When a user validates a zone, this zone validation status is managed dynamically by the display manager which modifies the zone display concerned according to its validation status. When each tabbed display/input zone corresponding to a node is validated by a user, the display manager modifies the display of at least one zone and the corresponding node in the tree diagram. The modification of a zone display can include changing the background color of the zone, the modification of a node display can include changing the color or shape of the level indicator of the corresponding node. Of course, other embodiments can be envisaged according to the present invention, such as changing the color or typeface of the node name in the tree diagram.

In the case of a node defined by a set of nodes at a lower level, the display manager, based on level indicators indicating a validated status for each lower-level node, is designed to cause this validated status to rise to the higher-level node by changing the display of the level indicator of the higher-level node. In addition, validation of the next higher node is activated if all of the lower nodes are activated. These functions are performed dynamically by the display manager.

For validation by a user, it is also possible to validate a node at a level given so that all of the nodes at lower levels are validated. Thus, a document can be validated in its entirety by performing the validation at the document node level. When the whole of the document is validated, the processing tool authorizes signature of the entire document by a user with the corresponding signature rights using the sign button 117. The processing unit computes a Hash function of the original document and creates a new XML document, containing this Hash function, to be signed thereby preserving this signature document. The processing unit will only provide the signature method to the display manager if the user concerned has the right to sign. If this method is provided to the display manager, the latter displays a signed icon that can be activated by the user concerned. The signature is then verified by the processing unit associated with the LDAP directory.

In the example of user rights and roles in FIG. 4, it will be noted that only an author and an editor can validate a document and only a signatory can sign this document. Thus, once an editor has validated all of the documents, he/she can talk to a signatory using the dialogue icon on the toolbar 104 and ask for the document to be signed. The dialogue concerns all users with dialogue rights whatever the status of the document and whichever workspace is involved. In a general manner, the functions offered by the server platform enable a specification for a given product to be drawn up between a distributor and a supplier. In the case of a document to be validated by different users (such as a supplier, an agent, a distributor) it can be useful to specify, on the nodes of the tree diagram, the user or users who have validated sections, chapters or the entire document. When the document is signed by one of the users, i.e. when the newly created XML document is signed, this indication can be carried by the document title in the tree diagram for example. These indicators will therefore be known to each user able to display the document.

It is clear that the embodiments of the present invention relate to the functions of the processing unit tool cooperating with the rights manager and the display manager, the display manager functions utilizing the data from a document provided by the processing unit and corresponding to the actions of a user on a displayed document.

When a user wishes to display a document on the display device, the processing unit retrieves the specification, chapter, section and sub-section data corresponding to a set of class instances including, for each class, methods enabling the validation status of the specification, chapters, sections and sub-sections, and of the corresponding tabs, to be retrieved.

The processing unit is capable of using this specification, chapter and section data to construct an XML type data flow reflecting the validation status of the document and the appearance of the tree diagram. This XML data flow generation is accomplished on the basis of suitable classes. The processing tool is also adapted to generate an HTML data flow from the XML flow.

The embodiments of the present invention are not limited to the embodiments described herein but extend to all other variants as understood by a person of ordinary skill in the art.

The invention claimed is:

1. A computer system for managing composite documents in a multi-user mode, including:
one or more server devices including:
a processor device for processing document data;
a document data display manager coupled to a display screen; and
a document user rights manager coupled to the processor device,
wherein, the processor device is configured to:
generate an object model, including a plurality of classes, structured to include a content pointer, a level indicator, an access mechanism, a validation mechanism, and a validation indicator, and
create and maintain in a data store a document in the form of a set of object model class instances,
wherein, the display manager is configured to concurrently display on the display screen a tree diagram of the document, a plurality of zones for the document, and a plurality of tabs, each level of the tree diagram being identified according to a level indicator, each of the plurality of zones corresponding to a node of the tree diagram and further providing contents of the class instances existing in the corresponding node of the tree diagram, and a tab of the plurality of tabs corresponding to the plurality of zones being displayed,
wherein, the processor is configured to only authorize access to the document according to access rights of a user concerned determined by the document user rights manager,
wherein, if the document is accessed, the processor device is configured to only authorize validation of a zone displayed for the document according to validation rights of the user concerned, as determined by the document user rights manager,
wherein, the display manager includes a first mechanism for concurrently modifying the display on the display screen of the zone and the display of the corresponding node in the tree diagram according to status of the validation of the zone, and a second mechanism, when all sibling nodes of a current node associated with a current zone are validated based on the level indicators of the nodes of the tree diagram, for validating a status of a parent of the current node of the tree display,
wherein, when a head of the tree diagram is validated, the processor device is configured to authorize signature for an entirety of the document by a user having corresponding signature rights, the processor device being further configured to transmit the signed document to a computer device for display thereon.

2. The computer system according to claim 1, wherein the tree diagram includes levels arranged in a descending hierarchy, in particular levels such as document, chapter and section, each level comprising one or more nodes.

3. The computer system according to claim 1, wherein a tabbed display/input zone corresponds to a node at a level.

4. The computer system according to claim 1, wherein the document user rights manager determines the user rights for a given document based on the instantiation of a method of reading the rights of that user.

5. The computer system according to claim 1, wherein the user rights for a document include at least some of the following rights: the right to display, print, search, preview, create, duplicate, link, delete, export, write, validate, discuss, publish, enter, and sign a document.

6. The computer system according to claim 1, wherein the document user rights manager determines the user role data for a given document based on the instantiation of a method of reading the role of that user, the role data being defined by a set of rights.

7. The computer system according to claim 1, wherein the user role data for a document includes at least some of the roles such as:
reader, defining at least the rights to display, print, search, preview, and export a document for a user,
author, defining at least the rights to create, duplicate, delete, and revise a document for a user,
editor, defining at least the rights to write, validate, and discuss a document for a user,
publisher, defining at least the right to publish a document for a user,
contributor, defining at least the rights to validate and discuss a document for a user,
signatory, defining at least the right to sign a document for a user.

8. The computer system according to claim 1, wherein:
the first mechanism is capable of changing the node color according to the validation status of the corresponding zone,
the second mechanism is capable, when the color of all the nodes at a level indicates that they are validated, of changing the node color of the higher level to indicate validation thereof.

9. The computer system according to claim 1, wherein the document user rights manager is designed to manage rights defined for a group of documents and/or for a set of users.

10. The computer system according to claim 1, wherein the display manager includes a third mechanism capable, based on the validation of a higher node, of propagating the node validation to lower levels.

* * * * *